United States Patent [19]

Matsumoto et al.

[11] Patent Number: 4,666,467

[45] Date of Patent: * May 19, 1987

[54] HIGH-STRENGTH METAL WORKING TOOL MADE OF A ZIRCONIA-TYPE SINTERED MATERIAL

[75] Inventors: Yoshihiro Matsumoto, Kanagawa; Yoshitaka Kubota, Aichi; Koji Tsukuma, Kanagawa; Takaaki Tsukidate, Tokyo, all of Japan

[73] Assignee: Toyo Soda Manufacturing Co., Ltd., Shinnanyo, Japan

[*] Notice: The portion of the term of this patent subsequent to May 6, 2003 has been disclaimed.

[21] Appl. No.: 719,151

[22] Filed: Apr. 2, 1985

[30] Foreign Application Priority Data

Apr. 6, 1984 [JP] Japan .................................. 59-67343
May 14, 1984 [JP] Japan .................................. 59-94614

[51] Int. Cl.$^4$ .......................... B24D 3/02; C04B 35/48
[52] U.S. Cl. ...................................... 51/309; 501/104; 501/105; 501/127; 501/152; 501/153; 407/119
[58] Field of Search ............... 501/103, 104, 105, 127, 501/152, 153; 51/309

[56] References Cited

U.S. PATENT DOCUMENTS

| 4,316,964 | 2/1982 | Lange | 501/126 X |
| 4,325,710 | 4/1982 | Tanaka et al. | 501/103 X |
| 4,360,598 | 11/1982 | Otagiri et al. | 501/152 X |
| 4,366,254 | 12/1982 | Rich et al. | 501/89 OR |
| 4,419,311 | 12/1983 | Claussen et al. | 501/105 X |
| 4,506,024 | 3/1985 | Claussen et al. | 501/103 X |
| 4,518,398 | 5/1985 | Tanaka et al. | 264/65 X |
| 4,525,464 | 6/1985 | Claussen et al. | 501/103 OR |
| 4,587,225 | 5/1986 | Tsukuma et al. | 501/128 X |

FOREIGN PATENT DOCUMENTS

| 0140638 | 5/1985 | European Pat. Off. | 501/104 |
| 0069471 | 4/1984 | Japan | 501/103 |

OTHER PUBLICATIONS

Larker, "Hot Isostatic Pressing for the Forming and Production of Ceramics", ASEA Journal 1981, vol. 54, No. 4.
Odebo, "HIP Economics of the 1980s", MPR, Jul. 1983.

Primary Examiner—Ferris H. Lander
Assistant Examiner—Karl Group
Attorney, Agent, or Firm—Oblon, Fisher, Spivak, McClelland & Maier

[57] ABSTRACT

A high strength metal working tool such as cutting tools and dies made of a zirconia-base sintered material comprising 50 to 98 weight percent of zirconia ($ZrO_2$) containing 1.5 to 5 mol percent of yttira ($Y_2O_3$) and 50 to 2 weight percent of alumina ($Al_2O_3$) and/or spinel ($MgAl_2O_4$) and having a three point bending strength of not less than 1700 MPa.

3 Claims, No Drawings

HIGH-STRENGTH METAL WORKING TOOL MADE OF A ZIRCONIA-TYPE SINTERED MATERIAL

BACKGROUND OF THE INVENTION

1. Field of the Invention

The present invention relates to a metal working tool such as cutting tools and dies, made of a zirconia-type sintered composition, containing zirconia ($ZrO_2$), alumina ($Al_2O_3$) and/or spinel ($MgAl_2O_4$) as well as a method for producing the sintered tool.

2. Description of the Prior Art

In the field of dies, conventionally dies, such as dies to be used in the hot and cold extrusion of metals and for the drawing and gathering of metal wires (hereinafter will simply be called die) have mostly been made of such metals as tool steels and super-hard alloys. However, these metal dies have an affinity to the metals to be extruded or drawn therethrough, and the metals easily stick to the dies, so that the end product will very often suffer from surface defects.

Recently, in the field of cutting tools, some types of ceramics have been found with increasing interest to be usable as high-speed cutting tools, and tools made of ceramics such as $Al_2O_3$, $Al_2O_3$-TiC, $Al_2O_3$-TiN and thermets have actually been developed. However, while these tools demonstrate an excellent cutting property against such materials as iron and steel, they have a drawback such that the toughness is poor and they are easily broken. Further, since they have an affinity to such materials as aluminium alloys and copper alloys, they are not suitable for cutting them.

Under such circumstances, partially stabilized zirconia has been developed as a material to overcome the drawbacks of the conventional materials in the field of cutting tools and dies.

A sintered tetragonal zirconia with the addition of a small amount of $Y_2O_3$ as a stabilizing agent (hereinafter called sintered Y-PSZ) has been proposed as material for a cutting tool for the cutting of so called "hard-to-cut" metals such as aluminum alloys (Japanese Patent Publication No. Sho 58-9784). However, these materials are not yet satisfactory in terms of the strength and hardness of the material.

A sintered material comprising a eutectic mixture of alumina and monoclinic and tetragonal zirconia produced by rapidly cooling the melt of binary system of zirconia and alumina has been developed for grinding stone. However, when the temperature in service of this material rises higher than 800° C., and when the material is cooled from such a high temperature down to a temperature below 800° C., the tetragonal crystals in the sintered material are transformed into monoclinic, causing the formation of cracks and collapse of the sintered structure. Therefore, this sintered material of eutectic structure of $Al_2O_3$ and $ZrO_2$ has a vital drawback that the grain-boundary strength is low. Application of this material to cutting tools and dies is dangerous when the working temperature exceeds 800° C.

In normal high-speed cutting of metals, the tools are often exposed to a temperature as high as 1000° C. In the field of dies, one made of a sintered zirconia material containing not less than 50 mol percent of tetragonal zirconia is disclosed in Japanese Patent Laid-Open Application No. Sho 58-161973. However, practical tests of this die have revealed that the die cracks during the test service, indicating that its mechanical strength is not satisfactory for the purposes.

SUMMARY OF THE INVENTION

The present inventors have made extensive studies for developing a cutting tool which can be used, for instance, in the high-speed cutting of "hard-to-cut" metals such as aluminum alloys, which can enjoy an elongated life of the tool as well as giving a smooth finish to the cut surface. Also the present inventors have made extensive studies for developing a die having a markedly improved mechanical strength yet having satisfactory toughness, which is free from cracking during the actual service. The present inventors have found a sintered material which can meet with the above objects.

The sintered material according to the invention is obtained by adding a specified amount of alumina ($Al_2O_3$) and/or spinel ($MgAl_2O_4$) to zirconia ($ZrO_2$), composed mainly of tetragonal crystals, and containing a small amount of yttria ($Y_2O_3$), and applying a hot hydraulic press onto the mixture for producing sintered article therefrom. The sintered article thus produced has an increased strength without deteriorating its toughness, and is suitable as a metal working tool such as a cutting tool and a die.

In investigating the reason for the high strength and high toughness of the sintered zirconia article partially stabilized with the addition of yttria according to the prior art, it has been proven by the present inventors that the addition of alumina and/or spinel, which have a modulus of elasticity larger than that of zirconia, to tetragonal zirconia increases its strength still more without deteriorating its toughness. The product obtained may be said to be a zirconia-alumina-type sinter partially stabilized with yttria.

The cutting tool according to the present invention can be applied for the cutting of a metal even under a severe cutting condition that a greater thermal and mechanical stress is given momentarily at a temperature as high as 1000° C. where a chemical reaction can easily take place between the cutting tool and the metal to be cut. Nevertheless, the cutting tool according to the present invention will not suffer from cracks or corner break-off in actual service, thus assuring a prolonged life.

The die according to the present invention can also be used under a great thermal and mechanical stress at higher temperatures. There is no danger that the die will crack and that its corner will be broken off during use. Due to the remarkable increase of the mechanical strength, the extrusion and elongation performance of the die can be greatly improved. For instance, in application of the die to wire drawing, it is possible to draw even a hard material such as steel at the ordinary temperature, not only improving the working environment but also sparing energy. In applying the die to hot extrusion, since the mechanical strength is high, it is possible to increase the extrusion speed and yet is possible to give an end product with a satisfactory surface quality, thus increasing the productivity.

DETAILED DESCRIPTION OF THE INVENTION

The present invention will be described in detail hereinbelow.

The sintered material according to the present invention comprises 50 to 98 weight percent of zirconia ($ZrO_2$), 1.5 to 5 mol percent of yttria ($Y_2O_3$) and 50 to 2 weight percent of alumina ($Al_2O_3$) and/or spinel ($MgAl_2O_4$). When the yttria content in zirconia is less than 1.5 mol percent, tetragonal zirconia crystals cannot be obtained, and when its content is more than 5 mol percent, the amount of tetragonal crystals in the sintered material decreases and the zirconia crystals obtained are predominantly cubic. Neither case is suitable because no satisfactory strengthening effect can be obtained due to the shortage of tetragonal zirconia. On the other hand, when the amount of alumina and/or spinel added to zirconia is less than 2 weight percent, no substantial improvement of the strength due to the addition thereof can hardly be expected, and when the addition is more than 50 weight percent, the strengthening effect due to the tetragonal zirconia crystals is weakened and a satisfactory strength cannot be obtained. Alumina and spinel may be added separately or in combination.

It is necessary that the three point bending strength of the sintered article is not less than 1700 MPa. The reason is that the sintered article having an average bending strength of not less than 1700 MPa can be regarded as having a remarkable strength. The three point bending strength defined in this place is the mean value of the rupture strength of not less than 10 test pieces having a width of 4 mm, thickness of 3 mm and length of 40 mm are tested under a condition in which the span length is 30 mm and the crosshead speed is 0.5 mm/min. according to JISR 1601(1981).

According to the present invention the zirconia-base sintered article is produced with the use of hot isostatic pressing (hereinafter will be called HIP). There are two methods for the treatment by HIP, one being to seal a formed body of powders in a capsule made of glass or metal under vacuum and then to fire it under pressure, and the other being to subject a formed body of powders to preliminary sintering under the ordinary pressure and then to re-sinter it with the use of a press under pressure. Both methods can be applied in the present invention, but the latter method can dispense with the operation of sealing the formed body of powders in a capsule and is beneficial in terms of the productivity. The HIP condition includes a pressure which is not less than 50 MPa and a treating temperature which is in the range of 1300° C. to 1700° C.

The preliminary sintered article to be subjected to HIP must have a relative density of not less than 90% and contain no open pores. In a case when the ratio of alumina and/or spinel to zirconia is less than 20 weight percent, it is desirable to establish the preliminary firing temperature at not more than 1400° C., and in a case when the ratio is not less than 20 weight percent, the preliminary firing temperature is desirably not more than 1500° C. The reason is that the sintered article obtained at a temperature above 1400° C. or 1500° C. contains large-sized open pores, prohibiting a sufficient pore removal by the HIP treatment. Therefore, it is an important premise in the present invention to produce a dense preliminary sintered article having no open pores at a temperature as low as possible below 1500° C. To obtain such a preliminary sintered article, it is desirable to use very fine powders having excellent sinterability as a starting material; zirconia powders having a primary particle diameter of 200 Å to 400 Å obtained by the wet process as the zirconia source, and high purity alumina and spinel powders obtained by the wet process or the co-precipitation process. It is also appropriate to use very fine powders synthesized by the co-precipitation from an aqueous solution containing zirconium and aluminum.

It is also possible in the present invention to subject fine powders of zirconia together with fine powders of alumina and/or spinel sealed in a capsule of glass or metal under vacuum to the HIP treatment.

As for the conditions of temperature and pressure in the HIP treatment, a sintered article with a desirable high strength cannot be obtained under a condition in which the pressure is not more than 50 MPa and the temperature is not more than 1300° C. On the other hand, when the temperature is more than 1700° C., although it is possible to obtain a product with a sufficient strength, the sintered article is thermally unstable so that cracks will be formed when the sintered article is kept for a long time at a temperature in the range from 200° C. to 300° C., and the reason thereof is that the particles in the sintered article grow thereby greater than 2 $\mu$m in diameter. Therefore, such a product is not suitable for practical use.

In the zirconia-type sintered article according to the present invention, the crystal phase of zirconia must be tetragonal or a mixed phase of tetragonal and cubic in the main. It is permitted, however, that not more than 30 weight percent (with respect to the zirconia crystals) of monoclinic crystals are coexistent. The mean crystal grain diameter must be not more than 2 $\mu$m. In a case when zirconia crystal grains of more than 2 $\mu$m in diameter coexist, the sintered article becomes thermally unstable and the transformation of the tetragonal zirconia crystals into the monoclinic crystals easily occurs, thus such a condition is not desirable.

When the sintered article comprises zirconia containing 2 to 3 mol percent of $Y_2O_3$ and to which 10 to 30 weight percent of alumina is added, the sintered article gives a very high mean bending strength with a value of 2000 to 2500 MPa. This value corresponds to about two times that of the value for a sintered article with no HIP treatment.

Such an astonishingly high increase of the strength cannot be found in using such materials as silicium nitride and silicium carbide. That is to say, the object of the present invention can advantageously be attained by the combined effect of the addition of alumina and/or spinel and the specified HIP treatment.

The cutting tool made of the sintered material according to the present invention exhibits, as compared with the conventional cutting tools, excellent heat resistance, high strength, and high hardness and toughness even under a very severe metal cutting condition. Further, they have only a slight affinity to the metals being cut and are chemically stable. Therefore, the cutting tool according to the present invention can particularly be used effectively in the applications where the strength and durability are of special importance.

Furthermore, the present inventive zirconia-base sintered dies can be used advantageously in the applications where strength and durability are required because of its high strength as compared with the conventional dies. In producing the present die, at first a sintered article with a desired shape is formed by the method as already mentioned. Then, the sintered article is machined and ground to a desired shape with the use of a cylindrical continuous cutting machine as well as others for producing the die.

Examples of the sintered article according to the present invention useful as a cutting tool and a die will be described hereinbelow, but the invention is not limited thereto.

EXAMPLE 1

80 weight percent of $ZrO_2$ powders with a primary particle diameter of 230 Å, which were obtained by co-precipitation with the addition of 2 mol percent of $Y_2O_3$ for the partial stabilization of zirconia with yttria, and 20 weight percent of high purity $Al_2O_3$ (with a purity of 99.9%) with a mean particle diameter of 0.4 μm were wet mixed and pulverized in methanol, and the mixture was dried for preparing the raw material powders. With the use of a rubber press, the thus prepared raw material powders were formed into a shape having a size of 5 mm in thickness, about 50 mm in width and about 60 mm in length. The formed article then underwent preliminary sintering at 1400° C. for 2 hours under the ordinary atmospheric pressure for the subsequent HIP treatment. The preliminary sintered article thus obtained was subjected to the HIP treatment at 1500° C. for one hour under 150 MPa preferably in an argon gas atmosphere to produce a sintered article to be worked into a cutting tool. The zirconia in the sintered article thus produced consisted chiefly of tetragonal zirconia, the mean particle diameter of the crystals constituting the sintered article was 0.5 μm, and the sintered article had a bending strength of 2470 MPa and a hardness HRA of 92.9. The sintered article was then machined and ground to produce a cutting tool with a size of 13 mm square, 4.0 mm in thickness and 0.6 mm/rev. in nose diameter. The preliminary sintering and the subsequent main sintering may be done in ordinary atmosphere such as in air, but preferably in inert gases.

The cutting tool thus produced was attached to a lathe, and a 2000-type high strength aluminum alloy was cut therewith under the condition of a cutting speed of 250 m/min., a check of 0.5 mm and a feed speed of 0.16. The abrasion loss of the surface of the cutting tool after working for 15 min. was not more than 10 μm, and the smoothness of the cut surface was nearly the same as obtained by a diamond tool.

EXAMPLE 2

The same raw material powders as in Example 1 were formed into a ring with an outer diameter of about 20 mm, an inner diameter of about 2 mm and a length of about 15 mm with the use of a rubber press. The thus obtained ring was then cut without sintering to a size of 16.0 mm in its outer diameter, 2.3 mm in its inner diameter and 11 mm in thickness to obtain a formed article of die, and the thus formed article was preliminary sintered at 1400° C. for 2 hours for the HIP treatment. The preliminary sintered article thus obtained was subjected to the HIP treatment at 1500° C. for one hour under 150 MPa to produce a sintered article to be worked into a die. The sintered article thus produced consisted chiefly of tetragonal zirconia, the mean particle diameter of the crystals constituting the sintered article being 0.5 μm, and the sintered article having a bending strength of 2350±150 MPa and a hardness HRA of 92.5±0.5. The sintered article was then machined and ground into a size of 12 mm in its outer diameter, 2 mm in die diameter and 8 mm in thickness, and put in a SKD steel under heat to produce a die for wire-elongation.

In elongating (fine-drawing) a copper wire by using the die thus produced, the elongation could be continued satisfactorily until 50 tons of the wire were treated. No problems occurred such as the formation of cracks or the break-off of the die, and the surface of the wire obtained was very smooth and excellent. In contrast to this, only 20 tons of a copper wire could be elongated by using a superhard tool material.

In elongating wire materials other than copper such as brass and copper alloys with the use of this die, the life of the die was two times that of the conventional superhard tool materials.

EXAMPLE 3

A cutting tool similar to that of Example 1 was prepared with the use of 80 weight percent of $ZrO_2$ powders with the primary particle diameter of 250 Å, which were obtained by co-precipitation with the addition of 3 mol percent of $Y_2O_3$, and 20 weight percent of high purity spinel with a mean particle diameter of 0.4 m. The bending strength of the cutting tool thus produced was 2400 MPa, and its hardness HRA was 93.0. In cutting a 2000-type aluminum alloy with the use of this cutting tool similarly as in Example 1, the abrasion loss of the cutting tool surface after working for 15 minutes was not more than 10 μm and the smoothness of the cut surface of the alloy was also satisfactory as in the case of Example 1.

What is claimed is:

1. A high strength metal working tool made of a zirconia-base sintered material having a three point bending strength of not less than 1700 MPa comprising the steps of preliminarily sintering a powder mixture consisting essentially of 50 to 98 weight percent of zirconia ($ZrO_2$) having a particle diameter of 200 Å to 400 Å and containing 1.5 and 5 mol percent of yttria ($Y_2O_3$) and 50 to 2 weight percent of alumina ($Al_2O_3$) and/or spinel ($MgAl_2O_4$) to obtain preliminary sintered articles with a relative density of not less than 90 percent, and sintering the thus obtained preliminary sintered articles by hot isostatic pressing at a temperature in the range of from 1300° C. to 1700° C. under a pressure of not less than 50 MPa.

2. A high strength metal working tool according to claim 1, in which the metal working tool is a die.

3. A high strength metal working tool according to claim 1, in which the metal working tool is a cutting tool.

* * * * *